United States Patent
Odell et al.

[11] Patent Number: 5,166,021
[45] Date of Patent: Nov. 24, 1992

[54] PHOTOCONDUCTIVE IMAGING MEMBERS WITH POLYCARBONATE FLUOROSILOXANE POLYMER OVERCOATINGS

[75] Inventors: Peter G. Odell; Dasarao K. Murti, both of Mississauga, Canada

[73] Assignee: Xerox Corporation, Stamford, Conn.

[21] Appl. No.: 693,184

[22] Filed: Apr. 29, 1991

[51] Int. Cl.⁵ ............................................. G03G 15/02
[52] U.S. Cl. ................................... 430/59; 430/56; 430/58
[58] Field of Search ........................... 430/59, 58, 56

[56] References Cited

U.S. PATENT DOCUMENTS

| | | | |
|---|---|---|---|
| 3,859,090 | 1/1975 | Yoerger et al. | 96/1.5 |
| 3,901,700 | 8/1975 | Yoerger et al. | 96/1 R |
| 4,260,671 | 4/1981 | Merrill | 430/67 |
| 4,291,110 | 9/1981 | Lee | 430/59 |
| 4,346,159 | 8/1982 | Sadamatsu et al. | 430/67 |
| 4,371,600 | 2/1983 | Schank et al. | 430/56 |
| 4,390,609 | 6/1983 | Wiedemann | 430/58 |
| 4,600,673 | 7/1986 | Hendrickson et al. | 430/66 |
| 4,618,551 | 10/1986 | Stolka et al. | 430/58 |
| 4,716,091 | 12/1987 | Yoshihara et al. | 430/66 |
| 4,917,980 | 4/1990 | Badesha et al. | 430/58 |
| 4,921,940 | 5/1990 | Odell et al. | 430/70 |
| 4,923,775 | 5/1990 | Schank | 430/59 |
| 4,956,256 | 9/1990 | Ohtsuka et al. | 430/58 |
| 5,080,987 | 1/1992 | Odell et al. | 430/59 |

*Primary Examiner*—Marion E. McCamish
*Assistant Examiner*—Mark A. Chapman
*Attorney, Agent, or Firm*—E. O. Palazzo

[57] ABSTRACT

Polycarbonatefluorosiloxane polymers of the following formula

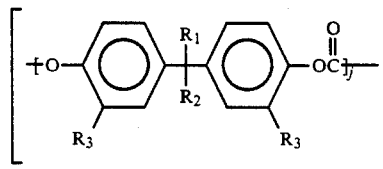

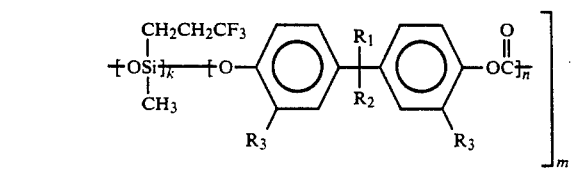

wherein $R_1$, $R_2$, and $R_3$ are independently selected from the group consisting of hydrogen, alkyl and aryl; k,j,m and n represent the number of repeating segments.

22 Claims, 1 Drawing Sheet

PHOTOCONDUCTIVE IMAGING MEMBERS WITH POLYCARBONATE FLUOROSILOXANE POLYMER OVERCOATINGS

BACKGROUND OF THE INVENTION

This invention is generally directed to photoconductive imaging members, and more specifically to imaging members with polycarbonate overcoatings. The present invention in one embodiment is directed to layered photoconductive imaging members, or photoconductors, comprised of a photogenerating layer, a charge transport layer in contact therewith, and a protective overcoating layer comprised of the polycarbonates illustrated herein. The aforementioned polycarbonates in embodiments of the present invention have incorporated therein polyfluorosiloxane telomers, thereby lowering the surface energy of the photoconductor and enabling, for example, superior release of the developed image with such polycarbonates. Disadvantages of toner and paper sticking to the photoconductor can be eliminated or minimized with the overcoatings of the present invention. Other advantages of the photoconductors of the present invention reside in the reduction of the surface energy of a photoreceptor which results in lower abrasive wear of the photoreceptor surface and preserves the designed thickness of the charge transport layer; a reduction in the charge transport layer thickness can lower the ability of the photoreceptor to accept charge, thereby lowering the contrast potential and reducing the quality of the developed image. In a specific embodiment, the present invention relates to layered imaging members comprised of a supporting substrate, such as aluminum, a photogenerating layer in contact therewith, a hole transport layer, and in contact with the hole transport layer a polycarbonate having incorporated therein polyfluorosiloxane telomers during, for example, the preparation by melt esterification. The charge, especially hole, transport layer can be in contact with the overcoating layer of the imaging member, or alternatively it may be situated between the supporting substrate and the photogenerating layer. The aforementioned polycarbonates can possess a number of advantages including, for example, resistance to abrasion, excellent tensile toughness characteristics, the solubility thereof in a number of solvents such as aromatic solvents including toluene, tetrahydrofuran, xylene, and benzene, and aliphatic solvents such as halogenated hydrocarbons thus permitting, for example, improved coatability thereof with organic charge transport components utilizing various known processes such as spray, dip, and draw-down coating. Tensile toughness represents the area of a stress strain curve when a sample of the material is strained to its breaking point, this phrase being well known in the art, and moreover there can be selected a known tensile test for films and coatings of the polycarbonate binders, which tests are capable of enabling the calculation of the Young's modulus, tensile strength, yield strength, percent elongation, and tensile toughness.

The novel polycarbonates illustrated herein may also be selected in an embodiment of the present invention as a resin binder for the charge generating layer, particularly since it is believed that such a binder may enable improved photogenerating pigment dispersion stability, and increased photosensitivity for the resulting imaging member.

The imaging members of the present invention can be selected for a number of imaging and printing processes including electrophotographic imaging and printing processes for an extended number of imaging cycles, exceeding 200,000 for example, while substantially avoiding or minimizing abrasion thereof. Also, the imaging members of the present invention can be selected for a number of color imaging and printing processes.

The formation and development of electrostatic latent images on the imaging surfaces of photoconductive materials by electrostatic means is well known. Numerous different photoconductive members for use in xerography are known such as selenium, alloys of selenium, layered imaging members comprised of aryl amine charge transport layers, reference U.S. Pat. No. 4,265,990, and imaging members with charge transport layers comprised of polysilylenes, reference U.S. Pat. No. 4,618,551. The disclosures of the aforementioned patents are totally incorporated herein by reference. With the aforementioned imaging members, especially those of the '990 patent, there can be selected aryl amine charge transport layers, which aryl amines are soluble in halogenated hydrocarbons such as methylene chloride. Further, the polycarbonates of the present invention can also be selected as overcoatings for the imaging members with electron transport layers, reference U.S. Pat. No. 4,474,865, the disclosure of which is totally incorporated herein by reference.

In U.S. Pat. No. 4,869,988 and U.S. Pat. No. 4,946,754, the disclosures of which are totally incorporated herein by reference, there are described layered photoconductive imaging members with transport layers incorporating, for example, biarylyl diarylamines, N,N-bis(biarylyl)anilines, and tris(biarylyl)amines as charge transport compounds. In the abovementioned patents, there are disclosed improved layered photoconductive imaging members comprised of a supporting substrate, a photogenerating layer optionally dispersed in an inactive resinous binder, and in contact therewith a charge transport layer comprised of the abovementioned charge transport compounds, or mixtures thereof dispersed in resinous binders.

Examples of specific hole transporting components disclosed in the '988 patent include N,N-bis(4-biphenylyl)-3,5-dimethoxyaniline (Ia); N,N-bis(4-biphenylyl)-3,5-dimethylaniline (Ib); N,N-bis(4-methyl-4'-biphenylyl)-3-methoxyaniline (Ic); N,N-bis(4-methyl-4'-biphenylyl)-3-chloroaniline (Id); N,N-bis(4-methyl-4'-biphenylyl)-4-ethylaniline (Ie); N,N-bis(4-chloro-4'-biphenylyl)-3-methylaniline (If); N,N-bis(4-bromo-4'-biphenylyl)-3,5-dimethoxy aniline (Ig); 4-biphenylyl bis(4-ethoxycarbonyl-4'-biphenylyl)amine (IIa); 4-biphenylyl bis(4-acetoxymethyl-4'-biphenylyl)amine (IIb); 3-biphenylyl bis(4-methyl-4'-biphenylyl)amine (IIc); 4-ethoxycarbonyl-4'-biphenylyl bis(4-methyl-4'-biphenylyl)amine (IId); and the like.

Examples of specific hole transporting compounds disclosed in U.S. Pat. No. 4,946,754 include bis(p-tolyl)-4-biphenylylamine (IIa); bis(p-chlorophenyl)-4-biphenylylamine (IIb); N-phenyl-N-(4-biphenylyl)-p-toluidine (IIc); N-(4-biphenylyl)-N-(p-chlorophenyl)-p-toluidine (IId); N-phenyl-N-(4-biphenylyl)-p-anisidine (IIe); bis(m-anisyl)-4-biphenylylamine (IIIa); bis(m-tolyl)-4-biphenylylamine (IIIb); bis(m-chlorophenyl)-4-biphenylylamine (IIIc); N-phenyl-N-(4-biphenylyl)-m-toluidine (IIId); N-phenyl-N-(4-bromo-4'-biphenylyl)-m-toluidine (IVa); diphenyl-4-methyl-4'-biphenylylamine (IVb); N-phenyl-N-(4-ethoxycarbonyl-4'- biphenylyl)-m-toluidine (IVc); N-phenyl-N-(4-methoxy-4'-biphenylyl)-m-toluidine (IVd); N-(m-anisyl)-N-(4-biphenylyl)-p-toluidine (IVe); bis(m-anisyl)-3-biphenylylamine (Va); N-phenyl-N-(4-methyl-3'-biphenylyl)-p-toluidine (Vb); N-phenyl-N-(4-methyl-3'-biphenylyl)-m-anisidine (Vc); bis(m-anisyl)-3-biphenylylamine (Vd); bis(p-tolyl)-4-methyl-3'-biphenylylamine (Ve); N-p-tolyl-N-(4-methoxy-3'-biphenylyl)-m-chloroaniline (Vf), and the like. The aforementioned charge, especially hole transport components, can be selected for the imaging members of the present invention in embodiments thereof.

It is also indicated in the aforementioned patents that there may be selected as resin binders for the charge transport molecules those components as illustrated in U.S. Pat. No. 3,121,006 including polycarbonates, polyesters, epoxy resins, polyvinylcarbazole; and also wherein for the preparation of the charge transport layer with a polycarbonate there is selected methylene chloride as a solvent.

There is also mentioned as prior art U.S. Pat. Nos. 4,657,993, the disclosure of which is totally incorporated herein by reference, directed to polyphosphazene homopolymers and copolymers of the formula as recited, for example, in the Abstract of the Disclosure, which components may be selected as photoconductive materials and for other uses, see column 1, and continuing on to column 2; 3,515,688 related to phosphonitrile elastomers, reference for example the Abstract of the Disclosure; 3,702,833 directed to curable fluorophosphazene polymers, see for example column 1; and 3,856,712 directed to polyphosphazene copolymers which are elastomers; and 4,921,940. The disclosures of each of the aforementioned patents are totally incorporated herein by reference.

In copending application U.S. Ser. No. 546,821 (D/90084), the disclosure of which is totally incorporated herein by reference, there is illustrated a layered photoconductive imaging member comprised of a supporting substrate, a photogenerating layer comprised of organic or inorganic photoconductive pigments optionally dispersed in an inactive resinous binder, and in contact therewith a charge transport layer comprised of the aryl amines as illustrated in U.S. Pat. Nos. 4,265,990; 4,464,750 and 4,921,773, the disclosures of which is totally incorporated herein by reference, which amines can be dispersed in a block copolymer resin binder of the formula:

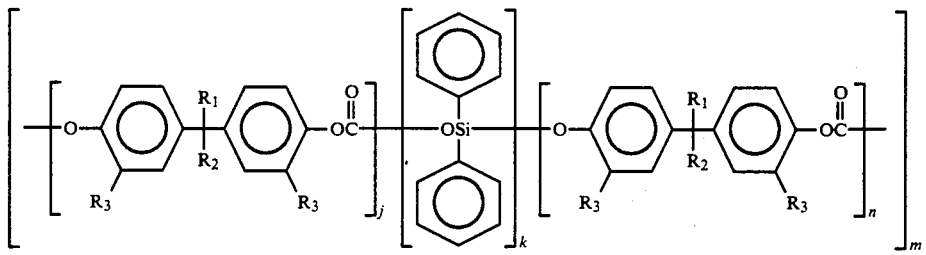

wherein $R_1$, $R_2$, and $R_3$ are independently selected from the group consisting of hydrogen, alkyl, and aryl; and k, j, m, and n represent the number of repeating units. The polycarbonatefluorosiloxane polymers of the present invention are believed to possess excellent release characteristics as indicated herein as compared to the aforementioned block copolymers of the U.S. Ser. No. 546,821 patent application.

While imaging members with various overcoatings are disclosed in the prior art, and are suitable for their intended purposes, there continues to be a need for improved imaging members, particularly layered members, with abrasion resistant surfaces. Another need resides in the provision of layered imaging members that are compatible with liquid developer compositions. Further, there continues to be a need for layered imaging members wherein the layers are sufficiently adhered to one another to allow the continuous use of such members in repetitive imaging systems. Also, there continues to be a need for improved layered imaging members comprised of hole transport layers wherein the problems of transport molecule crystallization, bleeding and leaching are avoided or minimized. Furthermore, there is a need for imaging members with protective overcoatings whereby there is enabled excellent toner image release therefrom, and wherein the photoconductor abrasion is avoided or minimized. A further need resides in the provision of photoconductive imaging members with desirable mechanical characteristics. A further need resides in providing for improved paper stripping from the photoreceptor surface.

SUMMARY OF THE INVENTION

It is, therefore, a feature of the present invention to provide layered photoresponsive, or photoconductor imaging members with many of the advantages indicated herein.

Also, it is a feature of the present invention to provide polycarbonates as overcoatings for layered photoconductive imaging members.

It is yet another feature of the present invention to provide layered photoresponsive imaging members with charge, especially hole transport layers in contact with a photogenerating layer, and protective polycarbonate overcoatings, which members are suitable for use with liquid and dry developers.

In a further feature of the present invention there is provided a layered photoresponsive imaging member with a photogenerating layer situated between a supporting substrate, and a hole transport layer with a polycarbonate resin binder.

In yet another feature of the present invention there is provided a photoresponsive imaging member comprised of a hole transporting layer situated between a supporting substrate and a photogenerating layer.

In another feature of the present invention there are provided imaging and printing methods with the layered imaging members disclosed herein.

Another feature of the present invention resides in the provision of novel polycarbonates with polyfluorosiloxane telomers, and processes thereof.

Also, in another feature of the present invention there are provided imaging members with excellent release characteristics.

In another feature of the present invention there are provided photoconductors with overcoatings of certain polycarbonates which photoconductors have excellent resistant to abrasion.

Another feature of the present invention resides in the provision of imaging members with electrical stability for an extended number of imaging cycles, for example exceeding 500,000 in some instances.

Furthermore, in another feature of the present invention there are provided overcoating polycarbonates with increased tensile strength, tensile toughness and improved elongation to break.

These and other features of the present invention can be accomplished in embodiments thereof by the provision of layered imaging members comprised, for example, of a photogenerating layer and a charge transport layer. More specifically, the present invention is directed to layered imaging members comprised of photogenerating layers, and in contact therewith hole transport layers comprised of, for example, hole transporting aryl amines, the amines of U.S. Pat. No. 4,299,897, the disclosure of which is totally incorporated herein by reference, and the like dispersed in a polycarbonate resin binder, which polycarbonate can be comprised of block copolycarbonates of bisphenols and polydiphenylsiloxane, or preferably MAKROLON ®, and wherein the imaging member contains a protective overcoating of a polycarbonate with polyfluorosiloxane telomers.

In one embodiment, the present invention is directed to a layered photoconductive imaging member comprised of a supporting substrate, a photogenerating layer comprised of organic or inorganic photoconductive pigments optionally dispersed in an inactive resinous binder, in contact therewith a hole transport layer comprised of the aryl amines as illustrated in U.S. Pat. No. 4,265,990, the disclosure of which is totally incorporated herein by reference, and the aforementioned '897 patent, which amines can be dispersed in a polycarbonate like MAKROLON ®, or the polycarbonates of the present invention, and an overcoating of a polycarbonate with polyfluorosiloxane telomers of the following formula:

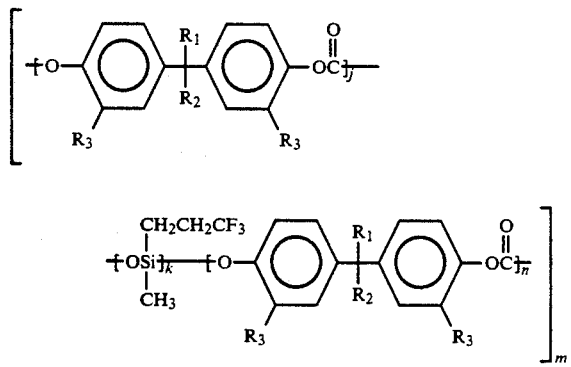

wherein j, k, n, and m represent the number of repeating segments, and $R_1$, $R_2$, and $R_3$ represent aliphatic and/or aromatic components, and more specifically wherein k corresponds to the degree of polymerization and, for example, is a number of from about 4 to about 12; j and n correspond to the degree of polymerization and are, for example, numbers of from about 4 to about 200; $R_1$ and $R_2$ are independently selected from the group consisting of hydrogen, alkyl, substituted alkyl, aryl, substituted aryl, and the like, wherein alkyl can be substituted with, for example, halogen such as fluoro, chloro and bromo, and aryl can contain substituents such as alkyl including methyl, ethyl, propyl, butyl, pentyl, hexyl, heptyl, octyl, nonyl, decyl, and the like; $R_3$ is alkyl, such as methyl, hydrogen or halogen such as chlorine or bromine; and m represents the number of repeating segments. Alkyl can be branched, for example, with alkyl groups or contain aryl substituents; and the $R_1$-C-$R_2$ can be a sulfonyl group, a carbonyl, oxygen, and the like; and this central substituent need not be 1,4 or para to the oxygen but could be 1,3 or meta to the oxygen. Alkyl contains, for example, from 1 to about 25 carbon atoms, and aryl contains, for example, from 6 to about 24 carbon atoms, such as methyl, ethyl, and the like, phenyl, benzyl, napthyl, cyclohexyl, t-butylcyclohexyl, phenylcyclohexyl, cycloheptyl and the like; $R_1$-C-$R_2$ can also be replaced by groups such as 1,2-phenylenebisisopropylidene or 1,4-phenylenebisisopropylidene. The aforementioned polymer in embodiments of the present invention possesses a number average molecular weight of from about 7,000 to about 100,000, and a weight average molecular weight of from about 15,000 to about 300,000, and a $M_w/M_n$ ratio of from about 2.0 to about 4.0 as determined by a Waters Gel Permeation Chromatograph employing four Ultrastyragel ® columns with pore sizes of 100, 500, 500, and $10^4$ Angstroms and using THF (tetrahydrofuran) as a solvent. It is believed that up to some maximum molecular weight polymer mechanical properties improve with increasing molecular weight. However, it is also believed that the coating technique chosen for photoreceptor fabrication can determine the choice of molecular weight, for example with spray coating usually a lower molecular weight polymer is selected.

Examples of polycarbonates of the present invention named herein according to the conventions of the International Union of Pure and Applied Chemistry as found in Source-Based Nomenclature for Copolymers, Pure & Appl. Chem., Vol. 57, No. 10, pages 1427 to 1440, 1985, the disclosure of which is totally incorporated herein by reference, include, for example, poly(4,4'-(1-phenylethylidene)bisphenol)carbonate with 10 weight percent of polymethyl-3,3,3-trifluoropropylsiloxane blocks, which can be named according to the above conventions as poly(poly(4,4'-(1-phenylethylidene)bisphenol)-carbonate-block-polymethyl-3,3,3-trifluoropropylsiloxane-block-poly(4,4'-(1-phenylethylidene)bisphenol)carbonate) (a:10:c mass percent) the polymer contains 10 percent by weight of polysiloxane. Examples of polycarbonates of the present invention include poly(-poly(4,4'-(1-phenylethylidene)bisphenol)carbonate-block-polymethyl-3,3,3-trifluoropropylsiloxane-block-poly(4,4'-(1-phenylethylidene)bisphenol)carbonate) (a:5:c mass percent), poly(poly(4,4'-(1-phenylethylidene)bisphenol)carbonate-block-polymethyl-3,3,3-trifluoropropylsiloxane-block-poly(4,4'-(1-phenylethylidene)bisphenol)carbonate) (a:15:c mass percent), poly(poly(4,4'-(1-phenylethylidene)bisphenol)carbonate-block-polymethyl-3,3,3-trifluoropropylsiloxane-block-poly(4,4'-(1-phenylethylidene)bisphenol)carbonate) (a:20:c mass percent), poly(poly(4,4'-cyclohexylidenebisphenol)carbonate-block-polymethyl-3,3,3-trifluoropropylsiloxane-block-poly(4,4'-cyclohexylidenebisphenol)carbonate), poly(poly(4,4'-cyclohexylidene-2,2'-dimethylbisphenol)carbonate-block-polymethyl-3,3,3-trifluoropropylsiloxane-block-poly(4,4'-cyclohexylidene-2,2'-dimethylbisphenol)carbonate), poly(poly(4,4'-(1,4-phenylenebisisopropylidene)bisphenol)carbonate-block-polymethyl-3,3,3-trifluoropropylsiloxane-block-poly(4,4'-(1,4-phenylenebisisopropylidene)bisphenol)carbonate), poly(poly(4,4'-isopropylidenebisphenol)carbonate-block-polymethyl-3,3,3-trifluoropropylsiloxane-block-poly(4,4'-isopropylidenebisphenol)carbonate), poly(poly(4,4'-cycloheptylidenebisphenol)carbonate-block-polymethyl-3,3,3-trifluoropropylsiloxane-block-poly(4,4'-cycloheptylidenebisphenol)carbonate), poly(poly(4,4'-diphenylmethylidenebisphenol)carbonate-block-polymethyl-3,3,3-trifluoropropylsiloxane-block-poly(4,4'-diphenylmethylidenebisphenol)carbonate), poly(poly(4,4'-(1-naphthylethylidene)bisphenol)carbonate-block-polymethyl-3,3,3-trifluoropropylsiloxane-block-poly(4,4'-(1-naphthylethylidene)bisphenol)carbonate), poly(poly(4,4'-(1,2-phenylenebisisopropylidene)bisphenol)carbonate-block-polymethyl-3,3,3-trifluoropropylsiloxane-block-poly(4,4'-(1,2-phenylenebisisopropylidene)bisphenol)carbonate), poly(poly(4,4'-(4-t-butylcyclohexylidene)bisphenol)carbonate-block-polymethyl-3,3,3-trifluoropropylsiloxane-block-poly(4,4'-(4-t-butylcyclohexylidene)bisphenol)carbonate), poly(poly(4,4'-(1,2-diphenylethylidene)bisphenol)carbonate-block-polymethyl-3,3,3-trifluoropropylsiloxane-block-poly(4,4'-(1,2-diphenylethylidene)bisphenol)carbonate), poly(poly(4,4'-(1,3-diphenylisopropylidene)bisphenol)carbonate-block-polymethyl-3,3,3-trifluoropropylsiloxane-block-poly(4,4' -(1,3-diphenylisopropylidene)bisphenol)carbonate), poly(poly(4,4'-(4-phenylcyclohexylidene)bisphenol)carbonate-block-polymethyl-3,3,3-trifluoropropylsiloxane-block-poly(4,4'-(4-phenylcyclohexylidene)bisphenol)carbonate), poly(poly(4,4'-cyclohexylidene-2,2'-dichlorobisphenol)carbonate-block-polymethyl-3,3,3-trifluoropropylsiloxane-block-poly(4,4'-cyclohexylidene-2,2'-dichlorobisphenol)carbonate), poly(poly(4,4'-cyclohexylidene-2,2'-dibromobisphenol)carbonate-block-polymethyl-3,3,3-trifluoropropylsiloxane-block-poly(4,4'-cyclohexylidene-2,2'-dibromobisphenol)carbonate), poly(poly(4,4'-isopropylidene-2,2'-dichlorobisphenol)carbonate-block-polymethyl-3,3,3-trifluoropropylsiloxane-block-poly(4,4'-isopropylidene-2,2'-dichlorobisphenol)carbonate), poly(poly(4,4'-(1-phenylethylidene)-2,2'-dibromobisphenol)carbonate-block-polymethyl-3,3,3-trifluoropropylsiloxane-block-poly(4,4'-(1-phenylethylidene)-2,2'-dibromobisphenol)carbonate), poly(poly(4,4'-sulfonyldiphenol)carbonate-block-polymethyl-3,3,3-trifluoropropylsiloxane-block-poly(4,4'-sulfonyldiphenol)carbonate), and the like. Additional examples include block copolymers where the polycarbonate blocks are prepared from more than one bisphenol structure, such as poly(poly(4,4'-cyclohexylidene-2,2'-dimethylbisphenol)-co-(4,4'-cyclohexylidenebisphenol)carbonate-block-polymethyl-3,3,3-trifluoropropylsiloxane-block-polypoly(4,4'-cyclohexylidene-2,2'-dimethylbisphenol)-co-(4,4'-cyclohexylidenebisphenol)carbonate), poly(poly(4,4'-isopropylidenebisphenol)-co-(4,4'-cyclohexylidenebisphenol)carbonate-block-polymethyl-3,3,3-trifluoropropylsiloxane-block-polypoly(4,4'-isopropylidenebisphenol)-co-(4,4'-cyclohexylidenebisphenol)carbonate), poly(poly(4,4'-hexafluoroisopropylidenebisphenol)-co-(4,4'-cyclohexylidenebisphenol)carbonate-block-polymethyl-3,3,3-trifluoropropylsiloxane-block-polypoly( 4,4'-hexafluoroisopropylidenebisphenol)-co-(4,4'-cyclohexylidenebisphenol)carbonate), poly(poly(4,4'-hexafluoroisopropylidenebisphenol)-co-(4,4'-(1,4-phenylenebisisopropylidene)bisphenol)carbonate-block-polymethyl-3,3,3-trifluoropropylsiloxane-block-polypoly(4,4'-hexafluoroisopropylidenebisphenol)-co-(4,4'-(1,4-phenylenebisisopropylidene)bisphenol)carbonate), poly(poly(4,4'-(1-phenylethylidene)bisphenol)-co-(4,4'-(1,4-phenylenebisisopropylidene)bisphenol)carbonate-block-polymethyl-3,3,3-trifluoropropylsiloxane-block-polypoly(4,4'-(1-phenylethylidene)bisphenol)-co-(4,4'-(1,4-phenylenebisisopropylidene)bisphenol)carbonate), and the like.

Examples of known polycarbonate block segments can be selected for the process of the present invention including the polymer structures as illustrated in U.S. Pat. No. 4,921,940, the disclosure of which is totally incorporated herein by reference, which blocks are obtained from the reaction of diphenylcarbonate with 4,4'-dihydroxydiphenyl-1,1-ethane, 4,4'-dihydroxydiphenyl-1,1-isobutane, 4,4'-dihydroxydiphenyl-2,2-propane, 4,4'-dihydroxydiphenyl-4,4-heptane, 4,4'-dihydroxydiphenyl-1,1-cyclohexane, 4,4'-dihydroxy-3,3'-dimethyldiphenyl-2,2-propane, 4,4'-dihydroxy-3,3',5,5'-tetrachlorodiphenyl-2,2-propane, 4,4'-dihydroxydiphenylsulfone, 4,4'-dihydroxydiphenylether, copolymers thereof, and the polycarbonates as illustrated in the aforementioned copending application. Many of the structures thereof may be located in Hermann Schnell's Chemistry and Physics of Polycarbonates, *Polymer Reviews*, V. 9, Interscience Publishers, principally the structures found in Tables IV-1 pages 86 to 90 and also Tables IV-2, V-1, V-2, V-3, V-4, V-5, and V-6, the disclosure of which is totally incorporated herein by reference.

The polycarbonates of the present invention can be prepared by known polyesterification methods with the primary exception that polyfluorosiloxane telomers are incorporated therein during the polyesterification reaction. Examples of polyfluorosiloxane telomers present in effective amounts of, for example, from about 1 weight percent to about 20 weight percent and preferably from about 5 weight percent to about 15 weight percent include polydiphenylfluoro siloxanes terminated with silanol end groups, polydimethyl siloxanes terminated with silanol end groups, silanol terminated siloxane mixtures containing both methyl and phenyl groups attached to the silicon atom where the amounts of components in the mixture vary from about 5 to about 95 percent, respectively.

More specifically, the polycarbonates of the present invention can be prepared by the reaction of one or more, for example up to 5, preferably 3, and more preferably 2, in an embodiment bisphenols with a diaryl carbonate, especially bis(aryl)carbonates, reference U.S. Pat. No. 4,345,062, the disclosure of which is totally incorporated herein by reference, such as diphenyl carbonate; the bis(aryl)carbonate reactants are also commonly referred to as carbonic acid aromatic diesters and include those described by Formula III in U.S. Pat. No. 3,163,008, the disclosure of which is totally incorporated herein by reference, column 2, lines 23 to 72, and column 3, lines 1 to 42, with preferred bis(aryl)carbonates being diphenyl carbonate, dicresyl carbonate, bis(2-chlorophenyl)carbonate, the bis-phenyl-carbonates of hydroquinone, resorcinol and 4,4'-dihydroxydiphenyl, the bisphenyl carbonates of the bis(4-hydroxyaryl)-alkanes, cycloalkanes, ethers, sulfides, sulfones, and the like; and a silanol terminated polysiloxane telomer, such as polydiphenyl siloxane in the presence of a catalyst, such as metal alkoxides, such as titanium butoxide, titanium isopropoxide, zirconium isopropoxide; metal acetates, such as magnesium acetate, zinc acetate; tin compounds, such as dibutyltin oxide, di-n-butyltin dimethoxide, tetraborate compounds, such as tetramethyl ammonium tetraphenyl borohydride, a titanium or zirconium alkoxides, metal diacetates, organotin compounds or borohydride based compounds. The diphenylcarbonate is, in an embodiment, used in molar excess with respect to the total number of moles of bisphenol and polysiloxane telomer employed; this excess being in the range of from about 5 percent to about 30 percent and preferentially about 10 percent. The catalyst is employed in an effective amount of, for example, from about 0.01 percent to about 1.0 percent molar relative to the bisphenol content, and preferentially in an amount of from about 0.1 to about 0.3 based on the bisphenol. This mixture is heated with stirring in a one liter steel reactor capable of maintaining a vacuum of at least as low as 1.0 mbar. The reactor should also be capable of heating to a temperature at least as high as 300° C. and be equipped with a condenser for the collection of the byproducts, such as phenol, of the polymerization and the molar excess of diphenylcarbonate. Specifically, such a reaction can be conducted as follows: there can be added to a one liter reactor 1-phenylethylidenebisphenol, about 270 grams, or approximately one mole, together with a molar excess of diphenyl carbonate of about 10 percent or 273.4 grams. To this mixture is added about 30 grams of a silanol terminated polymethyl-3,3,3-trifluoropropyl siloxane. A catalyst, such as titanium butoxide, can be added in the amount of about 0.5 milliliter as the solid bisphenols and diphenylcarbonate melt with heating. Heating is accomplished by electric element heater that surrounds the reactor vessel. The monomer mixture comprised of the bisphenols and diphenylcarbonate melts in the temperature range of about 80° C. to about 140° C. Upon melting, the reactor is sealed, stirring initiated, and a continuous stream of dry nitrogen gas is flushed through the reactor for 50 minutes. The reactor temperature is raised to about 220° C. over a period of about 50 minutes. This temperature is maintained while the pressure in the reactor is lowered by means of a mechanical vacuum pump. The pressure is lowered from about 1,000 mbar to about 500 mbar over a period of about 10 minutes. The pressure is then further reduced to about 0 mbar over a period of about 80 minutes. After the temperature has been maintained at 220° C. for about 100 to about 160 minutes, the temperature is increased to about 260° C. over a period of about 20 minutes. This temperature is maintained for about 90 minutes. The progress of the reaction may be monitored by the rise in the stirrer torque, the stirrer torque increases as the melt viscosity increases, and the rise in the viscosity is caused by the increase in the polymer molecular weight as the reaction progresses or by the collection of the phenol byproduct since 2 moles of phenol are produced by every mole of bisphenol that polymerizes, the extent of the polymerization can be directly followed. The temperature is then increased to about 280° C. in about 10 minutes. This temperature is maintained for about 120 minutes. The temperature is then increased to about 300° C. in about 10 minutes. This temperature is maintained for about 120 minutes. The reactor is then repressurized with dry nitrogen gas to atmospheric pressure and the molten polymer is drawn with large forceps from the reactor bottom into a dry inert atmosphere and cut with wire cutters where it is permitted to cool to room temperature, about 25° C., to provide the product poly(poly(4,4'-cyclohexylidenebisphenol)carbonate-block-polymethyl-3,3,3-trifluoropropylsiloxane-block-poly(4,4'-cyclohexylidenebisphenol)carbonate) (a:10:c mass percent). Subsequent to effecting purification of the product, it can be treated by the process outlined in U.S. Pat. No. 4,921,940, the disclosure of which is totally incorporated herein by reference, whereby, for example, 10 grams of the polycarbonate product was added to 100 milliliters of dimethylformamide as the polymer solvent containing 0.25 gram of tartaric acid as the complexing component. Following stirring of the mixture for 16 hours, the resulting polymer solution was precipitated into 3 liters of rapidly stirring deionized water. The polymer was recovered by filtration and dried overnight in a vacuum oven at about 80° C. The polymer obtained may be characterized by GPC to confirm siloxane incorporation into a high molecular weight polymer. Siloxane incorporation into the polymer backbone was determined by both NMR and by Supercritical Fluid Extraction of the polymer.

Examples of specific hole transporting molecules in addition to the aryl amines disclosed herein include, but are not limited to, those molecules of the following formulas wherein X is independently selected from the group consisting of hydrogen, halogen and alkyl, and preferably N,N'-diphenyl-N,N'-bis(3-methyl phenyl)-(1,1'-biphenyl)-4,4'-diamine.

The photoresponsive imaging members of the present invention can be prepared by a number of known methods, the process parameters and the order of the coating of the layers being dependent on the member desired. Thus, for example, the photoresponsive members of the present invention can be prepared by providing a conductive substrate with an optional charge blocking layer and an optional adhesive layer, and applying thereto a photogenerating layer, and overcoating thereon a charge transport layer dispersed in the polycarbonate resinous binder

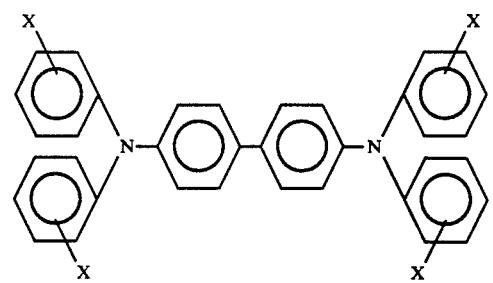

illustrated herein. The photoresponsive imaging members of the present invention can be fabricated by common known coating techniques such as by dip coating, draw-bar coating, or by spray coating process, depending mainly on the type of imaging devices desired. Each coating, however, can be usually dried, for example, in a convection or forced air oven at a suitable temperature before a subsequent layer is applied thereto. In one embodiment of the present invention, the transport layer can be fabricated from a 10 weight percent solution of the charge transporting molecules, which molecules are usually present in an amount of from about 35 to about 60 weight percent, and preferably 40 weight percent, and are dispersed in a polycarbonate resinous binder, or other known resin binder, preferably in an amount of 60 weight percent. The aforementioned solution can be obtained by stirring 6 grams of the selected polycarbonate and 4 grams of the charge transport molecule in 100 milliliters of toluene at ambient temperature. The resulting solution can then be draw bar coated on the photogenerating layer and thereafter dried. The drying temperature is dependent on a number of factors including the components selected, particularly the photogenerating component, but generally drying is accomplished at about 130° C., especially in situations wherein trigonal selenium is selected as the photogenerating pigment dispersed in a polyvinyl carbazole binder.

In an illustrative embodiment, the photoconductive imaging member of the present invention is comprised of (1) a conductive supporting substrate of MYLAR ® with a thickness of 75 microns and a conductive vacuum deposited layer of titanium with a thickness of 0.02 micron; (2) a hole blocking layer of N-methyl-3-aminopropyltrimethoxy silane with a thickness of 0.1 micron; (3) an adhesive layer of 49,000 Polyester (obtained from E. I. DuPont Chemical) with a thickness of 0.05 micron; (4) a photogeneration layer of trigonal selenium with a thickness of 1 micron; (5) a charge transport layer with a thickness of 2 microns of an aryl amine dispersed in a resin binder; and (6) an overcoating comprised of the polycarbonates with polyfluorosiloxane telomers illustrated herein.

DETAILED DESCRIPTION OF THE INVENTION

Figure 1:
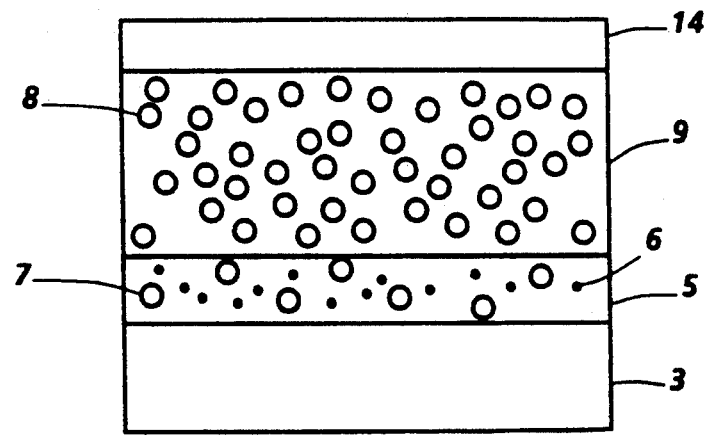
FIG. 1 represents a partially schematic cross-sectional view of a photoresponsive imaging member of the present invention.

Illustrated in FIG. 1 is a photoresponsive imaging member of the present invention comprising a supporting substrate 3 of a thickness of from about 50 microns to about 5,000 microns, a charge carrier photogenerating layer 5 of a thickness of from about 0.5 micron to about 5 microns comprised of photogenerating pigments 6 optionally dispersed in a resinous binder composition 7, a hole transport layer 9 of a thickness of from about 10 microns to about 60 microns comprised of an aryl amine dispersed in the polycarbonate MAKROLON ® illustrated herein resin binder 8, and an overcoating layer 14 comprised of the polycarbonates with a polyfluorosiloxane as illustrated herein.

Figure 2:
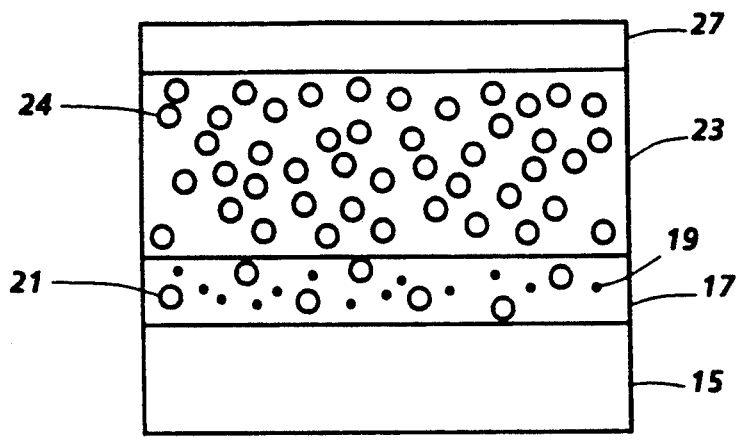
FIGS. 2 and 3 represent partially schematic cross-sectional views of photoresponsive imaging members of the present invention.

Illustrated in FIG. 2 is a photoresponsive imaging member of the present invention comprised of about a 25 micron to about a 100 micron thick conductive supporting substrate 15 of aluminized MYLAR ®, a 0.5 micron to about a 5 micron thick photogenerating layer 17 comprised of trigonal selenium photogenerating pigments 19 dispersed in a resinous binder 21 in the amount of 10 percent to about 80 percent by weight, and a 10 micron to about a 60 micron thick hole transport layer 23 comprised of the aryl amine charge transport N,N'-diphenyl-N,N'-bis(3-methylphenyl)1,1'-biphenyl-4,4'-diamine dispersed in the polycarbonate MAKROLON ® resin binder 24, or a poly(4,4'-(1-phenylethylidene)bisphenol carbonate with 10 weight percent of polydiphenyl siloxane blocks, based on the amount of polydiphenyl siloxane added to the polymerization, and confirmed by NMR integration; additionally, covalent incorporation of the polysiloxane blocks is supported by the absence of a separate low molecular weight peak in GPC studies of the polymer, which polycarbonate has a number average molecular weight of about 14,400, and a weight average molecular weight of about 36,900, and a dispersity of about 3.25 as determined by a Waters Gel Permeation Chromatograph employing four Ultrastyragel ® columns with pore sizes of 100, 500, 500, 10$^4$ Angstroms and using THF as solvent, and an overcoating 27 of a thickness of microns of the polycarbonate poly(poly(4,4'-cyclohexylidenebisphenol)carbonate-block-polymethyl-3,3,3-trifluoropropylsiloxane-block-poly(4,4'-cyclohexylidenebisphenol)carbonate).

Figure 3:
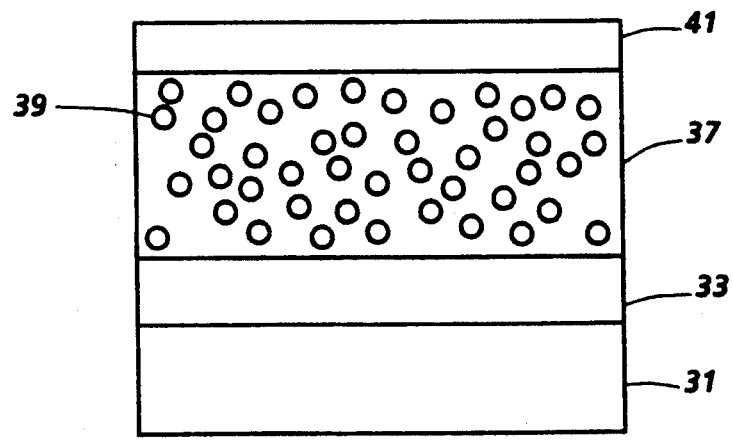

Another photoresponsive imaging member of the present invention, reference FIG. 3, is comprised of a conductive supporting substrate 31 of aluminum of a thickness of 50 microns to about 5,000 microns, a photogenerating layer 33 comprised of amorphous selenium or an amorphous selenium alloy, especially selenium arsenic alloy (99.5/0.5) or a selenium tellurium alloy (75/25), of a thickness of 0.1 micron to about 5 microns, and a 10 micron to about 60 micron thick hole transport layer 37 comprised of the aryl amine hole transport N,N'-diphenyl-N,N'-bis(3-methylphenyl)1,1'-biphenyl-4,4'-diamine, 55 weight percent, dispersed in a polycarbonate resin binder 39 of FIG. 2, and an overcoating 41 of a thickness of about 1 to 5 microns comprised of poly(poly(4,4'-cyclohexylidenebisphenol)carbonate-block-polymethyl-3,3,3-trifluoropropylsiloxane-block-poly(4,4'-cyclohexylidenebisphenol)carbonate).

Another example of the present invention is another photoresponsive imaging member of the present invention comprised of a 25 micron to 100 micron thick conductive supporting substrate of aluminized MYLAR ®, a 10 micron to about 70 micron thick hole transport layer comprised of N,N'-diphenyl-N,N'-bis(3-methylphenyl)1,1'-biphenyl-4,4'-diamine hole transport molecules, 55 weight percent, dispersed in the polycarbonate resin binder poly(4,4'-(1-phenylethylidene)bisphenol carbonate with 10 weight percent of polydiphenylsiloxane blocks, a 0.1 micron to about 5 micron thick photogenerating layer comprised of vanadyl phthalocyanine photogenerating pigments optionally dispersed in a polyester resinous binder in an amount of about 10 percent to about 80 percent by weight, and an overcoating of a thickness of about 1 to 5 microns comprised of poly(poly(4,4'-cyclohexylidenebisphenol)carbonate-block-polymethyl-3,3,3-trifluoropropylsiloxane-block-poly(4,4'-cyclohexylidenebisphenol)carbonate).

The supporting substrate layers may be opaque or substantially transparent and may comprise any suitable material possessing, for example, the requisite mechanical properties. The substrate may comprise a layer of an organic or inorganic material having a conductive surface layer arranged thereon or a conductive material such as, for example, aluminum, chromium, nickel, indium, tin oxide, brass or the like. The substrate may be flexible, seamless, or rigid and can be comprised of various different configurations such as, for example, a plate, a cylindrical drum, a scroll, and the like. The thickness of the substrate layer is dependent on many factors including, for example, the components of the other layers, and the like; generally, however, the substrate is generally of a thickness of from about 50 microns to about 5,000 microns.

Examples of photogenerating layers, especially since they permit imaging members with a photoresponse of from about 400 to about 700 nanometers, for example, include those comprised of known photoconductive charge carrier generating materials, such as amorphous selenium, selenium alloys, halogen doped amorphous selenium, doped amorphous selenium alloys doped with chlorine in the amount of from about 50 to about 200 parts per million, and trigonal selenium, cadmium sulfide, cadmium selenide; cadmium sulfur selenide, and the like, reference U.S. Pat. Nos. 4,232,102 and 4,233,283, the disclosures of each of these patents being totally incorporated herein by reference. Examples of specific alloys include selenium arsenic with from about 95 to about 99.8 weight percent of selenium; selenium tellurium with from about 70 to about 90 weight percent of selenium; the aforementioned alloys containing dopants, such as halogens, including chlorine in amounts of from about 100 to about 1,000 parts per million, ternary alloys, and the like. The thickness of the photogenerating layer is dependent on a number of factors, such as the materials included in the other layers, and the like; generally, however, this layer is of a thickness of from about 0.1 micron to about 5 microns, and preferably from about 0.2 micron to about 2 microns, depending on the photoconductive volume loading, which may vary from about 5 percent to about 100 percent by weight. Generally, it is desirable to provide this layer in a thickness which is sufficient to absorb about 90 percent or more of the incident radiation which is directed upon it in the imagewise exposure step. The maximum thickness of this layer is dependent primarily upon factors such as mechanical considerations, for example, whether a flexible photoresponsive device is desired. Also, there may be selected as photogenerators organic components such as squaraines, perylenes, reference for example U.S. Pat. No. 4,587,189, the disclosure of which is totally incorporated herein by reference, metal phthalocyanines, metal free phthalocyanines, vanadyl phthalocyanine, dibromoanthanthrone, and the like.

The hole transport layer can be comprised of one or a mixture of hole transporting molecules in the amount of from about 10 percent to about 60 percent by weight thereof in some embodiments of the transport molecules illustrated herein, and preferably the aryl amines illustrated herein. The thickness of the transport layer is, for example, from about 5 microns to about 50 microns with the thickness depending predominantly on the nature of intended applications. In addition, a layer of adhesive material located, for example, between the transport layer and the photogenerating layer to promote adhesion thereof can be utilized. This layer may be comprised of known adhesive materials such as polyester resins, reference 49,000 polyester available from E. I. DuPont Chemical Company, polysiloxane, acrylic polymers, and the like. A thickness of from about 0.001 micron to about 0.1 micron is generally employed for the adhesive layer. Hole blocking layers usually situated between the substrate and the photogenerating layer, and preferably in contact with the supporting substrate include, for example, those derived from the polycondensation of aminopropyl trialkoxysilane or aminobutyl trialkoxysilane, such as 3-aminopropyltrimethoxy silane, 3-aminopropyltriethoxy silane, or 4-aminobutyltrimethoxy silane thereby improving in some embodiments the dark decay characteristics of the imaging member. Typically, this layer has a thickness of from about 0.001 micron to about 5 microns or more in thickness, depending on the desired effectiveness for preventing or minimizing the dark injection of charge carriers into the photogenerating layer.

Other charge transport layer examples that may be selected are illustrated in U.S. Pat. Nos. 4,921,773 and 4,464,450, the disclosures of which are totally incorporated herein by reference.

The imaging members of the present invention can be selected for electrostatographic, especially xerographic, imaging and printing processes wherein, for example, a positively, or negatively charged imaging member is selected, and developing the image with toner comprised of resin, such as styrene acrylates, styrene methacrylates, styrene butadienes, and the like, pigment, such as carbon black, like REGAL 330 ® carbon black, and a known charge additive such as distearyl dimethyl ammonium methyl sulfate.

The following examples, except for any comparative examples, are being supplied to further define specific embodiments of the present invention, it being noted that these examples are intended to illustrate and not limit the scope of the present invention. Also, parts and percentages are by weight unless otherwise indicated.

EXAMPLE I

The reactor employed was a 1 liter stainless steel reactor equipped with a helical coil stirrer and a double mechanical seal. It was driven by a 0.5 hp motor with a 30:1 gear reduction. A torque meter was part of the stirrer drive. The reactor was heated electrically. The pressure was monitored by both pressure transducer and pirani gauge. The temperature was monitored by platinum RTD's. The pressure and temperature were precisely controlled and profiled by a Fischer and Porter Chameleon controller. A specially designed condenser ensured the monitoring of efficient condensation of phenol and diphenylcarbonate; these materials are both solids at room temperature and the condenser design ensures that when they solidify they do not plug a line between the reactor and the vacuum pump which would cause the reaction to cease. In addition, at the low pressures below from 0.1 to 100 mbar used at the reaction end phenol has sufficient vapor pressure at room temperature and above that it can interfere with the polymerization by either raising the lowest pressure achievable by the system or by subliming to other parts of the condenser and plugging a line. In this condenser, the diameter of the pipe from the reactor to the condenser was $\frac{3}{8}$ inch. The major fraction of the line consists of flexible steel piping to avoid having to exactly position both reactor and condenser. A heating mantle was used to wrap this line. The condensation takes place in a 6 inch diameter stainless steel pipe about 16 inches long. The condensing surface itself consists of five 12 inch flexible steel tubes running parallel to each other, hung vertically, with four tubes arranged around the central one. To cool the condensing surface, there was used cold nitrogen gas. The cold nitrogen enters the four outer tubes, descends to the bottom, then rises up the central tube. The nitrogen flow is controlled by a flow meter with a typical flow rate in the range of 20 to 30 liters per minute$^{-1}$. The byproducts such as phenol, cresol, chlorophenol, a mixture of phenol and hydroquinone, a mixture of phenol and resorcinol, a mixture of phenol and biphenol, or a mixture of phenol with one of 4,4'-dihydroxyarylalkanes, 4,4'-dihydroxycycloalkanes, 4,4'-dihydroxyethers, 4,4'-dihydroxysulfides, 4,4'-dihydroxysulfones, and the like drips as a liquid into the glass bottom portion of the condenser which was joined to the upper stainless steel portion by a ball valve. This glass piece at the bottom is a 250 milliliter graduated cylinder. Through this glass the amount and rate of phenol condensation can be monitored. When the reaction pressure was low enough, usually between about 10 and about 100 mbars, that the vapor pressure of the phenol becomes a significant contribution to the reactor pressure, the ball valve is closed to isolate the bulk of the phenol and the temperature of the nitrogen gas in the condensing element is lowered to below $-80°$ C. In this manner, solid phenol was collected. The line leaving the condenser to the vacuum pump is ½ inch in diameter to further reduce any chance of plugging. Since the polymerization is driven by the removal of phenol, which in turn is driven by pressure and temperature, control of these variables is most important. A series of valves and a rotary oil pump provided controlled variations in reactor pressure.

There was added to the above reactor 270.0 grams of bisphenol (z) (4,4'-cyclohexylidenediphenol) as obtained, for example, by the process as illustrated in Example I of U.S. Pat. No. 4,766,255, the disclosure of which is totally incorporated herein by reference; 31.7 grams of polymethyl-3,3,3-trifluoropropylsiloxane, silanol terminated, obtained from Petrarch Systems, (now Huls); 273.4 grams of diphenylcarbonate and 0.50 milliliter of titanium (IV) butoxide. The reactor was then sealed and heated to 220° C., and the pressure lowered from 1,000 millibar (atmospheric pressure) to about 750 millibar in a period of about 20 to 25 minutes. Phenol began to collect in the condenser and the amount was observed through the lower glass portion of the condenser. The rate of pressure decrease was then slowed so that about 80 minutes were required to reach a pressure of 5 millibar. During the slow pressure drop about 110 to 130 milliliters of phenol was observed to collect in the lower glass portion of the condenser. When the pressure reached about 100 millibar, the temperature of the nitrogen gas cooling the condensing element was lowered from about 16° C. to about $-84°$ C. After 130 minutes at 220° C., the temperature was increased to 260° C. and heating was continued for 90 minutes. Thereafter, the temperature was increased to 280° C. and heating was continued for 120 minutes. Thereafter, the temperature was increased to 300° C. and heating was continued for 167 minutes, and the molten polymer resulting was drawn from the reactor by pulling with large forceps into a dry nitrogen atmosphere to prevent hydrolysis or oxidation of the heated polymer, which after cooling had a weight average molecular weight in polystyrene equivalents of 36,900 as determined by GPC. The incorporation of the siloxane telomer was confirmed by GPC and NMR. A sample of ten (10) grams of the obtained polycarbonate product was added to 100 milliliters of dimethylformamide as the polymer solvent containing 0.25 gram of tartaric acid as the complexing component. Following the stirring of the mixture for 16 hours, the resulting polymer solution was precipitated into 3 liters of rapidly stirring deionized water. The polymer poly(poly(4,4'-cyclohexylidenebisphenol)carbonate-block-polymethyl-3,3,3-trifluoropropylsiloxane-block-poly(4,4'-cyclohexylidenebisphenol)carbonate) with Tg of 159° C. was recovered by filtration and dried overnight (18 hours) in a vacuum oven at about 80° C.

EXAMPLE II

The processes of Example I could be repeated with the exceptions that there could be selected 270 grams of bisphenol (AP) (4,4'-(1-phenylethylidene)bisphenol); 30 grams of methyl-3,3,3-trifluoropropylsiloxane, silanol terminated; and 273.4 grams of diphenylcarbonate. The resulting block copolymer would be poly(poly(4,4'-(1-phenylethylidene)bisphenol)carbonate-block-polymethyl-3,3,3-trifluoropropylsiloxane-block-poly(4,4'-(1-phenylethylidene)bisphenol)carbonate) (a:10:c mass percent).

EXAMPLE III

The processes of Example I could be repeated with the exceptions that there could be selected 285 grams of bisphenol (AP) (4,4'-(1-phenylethylidene)bisphenol); 15 grams of methyl-3,3,3-trifluoropropylsiloxane, silanol terminated; and 273.4 grams of diphenylcarbonate. The resulting block copolymer would be poly(poly(4,4'-(1-phenylethylidene)bisphenol)carbonate-block-polymethyl-3,3,3-trifluoropropylsiloxane-block-poly(4,4'-(1-phenylethylidene)bisphenol)carbonate) (a:5:c mass percent).

EXAMPLE IV

The processes of Example I could be repeated with the exceptions that there could be selected 270 grams of bisphenol (P) (4,4'-(1,2-phenylenebisisopropylidene)bisphenol); 15 grams of methyl-3,3,3-trifluoropropylsiloxane, silanol terminated; and 273.4 grams of diphenylcarbonate. The resulting block copolymer would be poly(poly(4,4'-(1,4-phenylenebisisopropylidene)bisphenol)-carbonate-block-polymethyl-3,3,3-trifluoropropylsiloxane-block-poly(4,4'-(1,4-phenylenebisisopropylidene)-bisphenol)carbonate).

EXAMPLE V

The processes of Example I could be repeated with the exceptions that there could be selected 270 grams of bisphenol (C) (4,4'-isopropylidenebis(2-methyl)phenol); 15 grams of methyl-3,3,3-trifluoropropylsiloxane, silanol terminated; and 273.4 grams of diphenylcarbonate. The resulting block copolymer would be poly(poly(4,4'-isopropylidenebis(2-methyl)phenol)polycarbonate-block-polymethyl-3,3,3-trifluoropropylsiloxane-block-poly(4,4'-isopropylidenebis(2-methyl)phenol)carbonate).

EXAMPLE VI

The polymer of Example I and comparative polymers were tested as described below. The comparative polymers used were poly(4,4'-isopropylidenebisphenol)carbonate, available as MAKROLON ® and poly(4,4'-cyclohexylidenebisphenol)carbonate.

Three separate solutions for an overcoating layer were prepared by dissolving in each instance 0.1 gram of the charge transport molecule N,N'-diphenyl-N,N'-bis(3-methylphenyl)1,1'-biphenyl-4,4'-diamine and 1.0 gram of one of the above two polymers, and the polymer of Example I in 10 milliliters of methylene chloride. This solution was coated on top of a glass plate by means of a Bird film applicator. The resulting coatings were dried in a forced air oven at 135° C. for 20 minutes. Upon cooling, the films were carefully peeled from the glass plate. Several strips 13 centimeters by 1.5 centimeters and about 30 microns thick were prepared and used for mechanical testing. Mechanical testing was done with samples of the above prepared coatings with a sample size of 5 centimeters in length and with a width of 1.5 centimeters. Tensile tests were then conducted on an Instron materials testing system (Model #1123). The type of test used was a tensile test for films and coatings, ASTM test method D 882, capable of calculating the Young's modulus, tensile strength, yield strength, percent elongation and tensile toughness. The tensile toughness is the area of the stress-strain curve when the sample is strained to the breaking point. The results are contained in the following table. The Young's modulus is the ratio of the tensile stress to the strain in the linear portion of the stress-strain curve. The result is expressed in force per unit area, usually gigapascals (GPa) or pounds force per square inch (psi). The tensile strength is calculated by dividing the load at breaking point by the original cross-sectional area of the test specimen. The result is expressed in force per unit area, usually megapascals (MPa) or pounds force per square inch (psi). The yield strength is calculated by dividing the load at the yield point by the original cross-sectional area of the test specimen. The result is expressed in force per unit area, usually megapascals (MPa) or pounds force per square inch (psi). The percentage elongation at break is calculated by dividing the elongation at the moment of rupture of the test specimen by the initial gauge length (for example 5 centimeters in this Example) of the specimen and multiplying by 100. The tensile toughness is the total energy absorbed per unit volume of the specimen up to the point of rupture. The result is expressed in units of Joules cm$^{-3}$.

The results are shown in Table 1. The data indicates that the polymer of Example I has a higher modulus and tensile toughness despite, it is believed, having the lowest molecular weight for this group of polymers typically used in photoreceptor applications.

TABLE 1

MECHANICAL PROPERTIES OF POLYMER BINDERS FOR P/R

| Polymer Structure | Molecular Weight (GPC) | Yield Strength MPa | Young's Modulus GPa | Tensile Toughness Joules/cm3 |
| --- | --- | --- | --- | --- |
| Example I Polymer | 36,900 | 80.1 | 2.1 | 105.0 |
| Makrolon ® poly(4,4'-isopropylidene bisphenol) carbonate | 100,000 | 56.4 | 2.1 | 72.0 |
| poly(4,4'-cyclohexylidene bisphenol) carbonate | 57,400 | 59.7 | 2.0 | 2.65 |
| poly(4,4'-cyclohexylidene bisphenol) carbonate | 48,100 | 59.8 | 2.0 | 2.65 |

EXAMPLE VII

A photoresponsive imaging member was prepared by providing an aluminized MYLAR ® substrate in a thickness of 75 microns, followed by applying thereto with a Bird film applicator a solution of N-methyl-3-aminopropyl-trimethoxy silane (obtained from PCR Research Chemicals) in ethanol (1:20 volume ratio). This hole blocking layer, 0.1 micron, was dried for 5 minutes at room temperature, and then cured for 10 minutes at 110° C. in a forced air oven. There was then applied to the above silane layer a solution of 0.5 percent by weight of 49,000 polyester (obtained from E. I. DuPont Chemical) in a mixture of methylene chloride and 1,1,2-trichloroethane (4:1 volume ratio) with a Bird film applicator. The layer was allowed to dry for one minute at room temperature, and 10 minutes at 100° C. in a forced air oven. The resulting adhesive layer had a dry thickness of 0.05 micron.

A dispersion of trigonal selenium and poly(N-vinylcarbazole) was prepared by ball milling 1.6 grams of trigonal selenium and 1.6 grams of poly(N-vinylcarbazole) in 14 milliliters each of tetrahydrofuran and toluene. A 1.0 micron thick photogenerator layer was then fabricated by coating the above dispersion onto the above adhesive layer present on the MYLAR ® substrate with a Bird film applicator, followed by drying in a forced air oven at 135° C. for 5 minutes.

A solution of 4.0 grams of N,N'-diphenyl-N,N'-bis(3-methylphenyl)1,1'-biphenyl-4,4'-diamine and 6.0 grams of MAKROLON ® polycarbonate in 100 milliliters of methylene chloride was then coated over the photogenerator layer by means of a multiple-clearance film applicator. The resulting device was subsequently dried in a forced air oven at 135° C. for 30 minutes resulting in a 22 micron thick charge transport layer with 60 weight percent of the resin binder comprised of MAKROLON ®. A solution for the overcoating layer was prepared by dissolving 0.1 gram of N,N'-diphenyl-N,N'-bis(3-methylphenyl)1,1'-biphenyl-4,4'-diamine and 1.0 gram of the poly(poly(4,4'-cyclohexylidenebisphenol)carbonate-block-polymethyl-3,3,3-trifluoropropyl siloxane-block-poly(4,4'-cyclohexylidenebisphenol)carbonate) of Example I. This solution was overcoated on top of the charge transport layer by means of a Bird film applicator. The resulting overcoated photoreceptor device was dried in a forced air oven at 135° C. for 20 minutes resulting in a 3 micron thick overcoated layer.

The above fabricated imaging members were electrically tested by negatively charging it with a corona, and discharged by exposing it to white light of wavelengths of from 400 to 700 nanometers. Charging was accomplished with a single wire corotron in which the wire was contained in a grounded aluminum channel and was strung between two insulating blocks. The acceptance potential of this imaging member after charging, and its residual potential after exposure were recorded. The procedure was repeated for different exposure energies supplied by a 75 watt Xenon arc lamp of incident radiation, and the exposure energy required to discharge the surface potential of the member to half of its original value was determined. This surface potential was measured using a wire loop probe contained in a shielded cylinder, and placed directly above the photoreceptor member surface. This loop was capacitively coupled to the photoreceptor surface so that the voltage of the wire loop corresponds to the surface potential. Also, the cylinder enclosing the wire loop was connected to the ground.

The above imaging member with the overcoated layer was negatively charged to a surface potential of 800 volts, and discharged to a residual potential of 7 volts. The dark decay of this device was about 20 volts/second. The half-decay exposure sensitivity was 1.9 ergs/cm$^2$. Further, the electrical properties of the above prepared photoresponsive imaging member remained essentially unchanged for 10,000 cycles of repeated charging and discharging.

EXAMPLE VIII

A layered photoresponsive imaging member was fabricated by repeating the procedure of Example VII with the exceptions that a 0.5 micron thick layer of amorphous selenium as a photogenerating coating on a ball grained aluminum plate of a thickness of 7 mils (175 microns) was utilized, and wherein conventional vacuum deposition techniques were selected. Vacuum deposition of the selenium photogenerating layer was accomplished at a vacuum of $10^{-6}$ Torr, while the substrate was maintained at about 50° C. The device was cooled to room temperature (about 20° C.) and the charge transport layer of Example VII was coated and dried at 40° C. for 1 hour. The thickness of the charge transport layer was 24 microns. Subsequently, an overcoating layer of Example VII was coated on top of the charge transport layer and dried at 40° C. for 1 hour. The thickness of the overcoating layer was 2 microns. The imaging member was electrically tested by repeating the procedure of Example VII with the exception that a 450 nanometer monochromatic light was selected for irradiation. This imaging member was negatively charged to 850 volts and discharged to a residual potential of 30 volts. The dark decay of this device was 5 volts/second.

EXAMPLE IX

A titanized MYLAR ® substrate with a thickness of about 75 microns comprised of MYLAR ® with a thickness of 75 microns and titanium film with a thickness of 0.02 micron was obtained from Martin Processing Inc. The titanium film was coated with a solution of 1 milliliter of 3-aminopropyltrimethoxysilane in 100 milliliters of ethanol. The coating was heated at 110° C. for 10 minutes, resulting in the formation of a 0.1 micron thick polysilane layer. The polysilane layer is a hole blocking layer and prevents the injection of holes from the titanium film and blocks the flow of holes into the charge generation layer. The polysilane layer is used to obtain the desired initial surface charge potential of about −800 volts for this imaging member. A dispersion of a photogenerator prepared by ball milling a mixture of 0.07 gram of vanadyl phthalocyanine and 0.13 gram of Vitel PE-200 polyester (Goodyear) in 12 milliliters of methylene chloride for 24 hours was coated by means of a Bird film applicator on top of the polysilane layer. After drying the coating in a forced air oven at 135° C. for 10 minutes, a 0.5 micron thick vanadyl phthalocyanine photogenerating layer with 35 percent by weight of vanadyl phthalocyanine and 65 percent by weight of polyester was obtained.

A solution of 4.0 grams of N,N'-diphenyl-N,N'-bis(3-methylphenyl)1,1'-biphenyl-4,4'-diamine and 6.0 grams of MAKROLON ® polycarbonate in 100 milliliters of methylene chloride was then coated over the photogenerator layer by means of a multiple-clearance film applicator. The resulting device was subsequently dried in a forced air oven at 135° C. for 30 minutes resulting in a 22 micron thick charge transport layer with 60 weight percent of the resin binder comprised of MAKROLON ®. A solution for the overcoating layer was prepared by dissolving 0.1 gram of N,N'-diphenyl-N,N'-bis(3-methylphenyl)1,1'-biphenyl-4,4'-diamine and 1.0 gram of the poly(poly(4,4'-cyclohexylidenebisphenol)carbonate-block-polymethyl-3,3,3-trifluoropropyl siloxane-block-poly(4,4'-cyclohexylidenebisphenol)carbonate) of Example I. This solution was overcoated on top of the charge transport layer by means of a Bird film applicator. The resulting overcoated photoreceptor device was dried in a forced air oven at 135° C. for 20 minutes resulting in a 4 micron thick overcoated layer.

The fabricated imaging member was tested electrically in accordance with the procedure of Example VII. Specifically, this imaging member was negatively charged to 800 volts and discharged when exposed to monochromatic light of a wavelength of 830 nanometers. The half-decay exposure sensitivity for this device was 10 ergs/cm$^2$ and the residual potential was 15 volts. The electrical properties of this imaging member remained essentially unchanged after 1,000 cycles of repeated charging and discharging.

Although the invention has been described with reference to specific preferred embodiments, it is not intended to be limited thereto but rather those skilled in the art will recognize variations and modifications may be made therein which are within the spirit of the invention and within the scope of the following claims.

What is claimed is:

1. A photoconductive imaging member comprised of a photogenerating layer, a transport layer comprised of charge transport molecules dispersed in a resinous binder and an overcoating comprised of a polycarbonatefluorosiloxane polymer of the formula

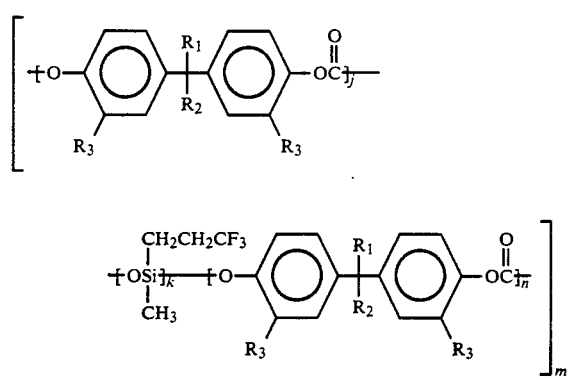

wherein R$_1$, R$_2$, and R$_3$ are independently selected from the group consisting of hydrogen, alkyl and aryl; and k, j, m and n represent the number of repeating segments.

2. A photoconductive imaging member in accordance with claim 1 containing a supporting substrate.

3. A photoconductive imaging member in accordance with claim 2 wherein the supporting substrate is comprised of a conductive component on an organic polymeric composition.

4. A photoconductive imaging member in accordance with claim 1 wherein the transport layer contains aryl diamine hole transport molecules.

5. A photoconductive imaging member in accordance with claim 4 wherein the hole transport molecules are comprised of aryl amines of the formula

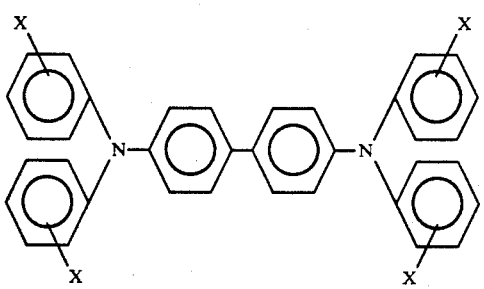

wherein X is independently selected from the group consisting of hydrogen, alkyl and halogen.

6. A photoconductive imaging member in accordance with claim 4 wherein the hole transport molecules are comprised of the aryl amine N,N'-diphenyl-N,N'-bis(3-methylphenyl)-(1,1'-biphenyl)-4,4'-diamine.

7. A photoconductive imaging member in accordance with claim 1 wherein the photogenerating layer is situated between a supporting substrate and the charge transport layer.

8. A photoconductive imaging member in accordance with claim 1 wherein the charge transport layer is situated between the photogenerating layer and a supporting substrate.

9. A photoconductive imaging member in accordance with claim 1 wherein the photogenerating layer is comprised of photogenerating pigments dispersed in a resinous binder in an amount of from about 5 percent by weight to about 95 percent by weight.

10. A photoconductive imaging member in accordance with claim 1 containing a charge blocking layer and an adhesive layer.

11. A photoconductive imaging member in accordance with claim 1 containing an organosilane charge blocking layer and an adhesive layer.

12. An imaging member in accordance with claim 1 wherein the polymer overcoating is a block copolymer selected from the group consisting of the block copolymers poly(poly(4,4'-(1-phenylethylidene)bisphenol)carbonate-block-polymethyl-3,3,3-trifluoropropylsiloxane-block-poly(4,4'-(1-phenylethylidene)bisphenol)carbonate), poly(poly(4,4'-cyclohexylidenebisphenol)carbonate-block-polymethyl-3,3,3-trifluoropropylsiloxane-block-poly(4,4'-cyclohexylidenebisphenol)carbonate), poly(poly(4,4'-cyclohexylidene-2,2'-dimethylbisphenol)carbonate-block-polymethyl-3,3,3-trifluoropropylsiloxane-block-poly(4,4'-cyclohexylidene-2,2'-dimethylbisphenol)carbonate), poly(poly(4,4'-(1,4-phenylenebisisopropylidene)bisphenol)carbonate-block-polymethyl-3,3,3-trifluoropropylsiloxane-block-poly(4,4'-(1,4-phenylenebisisopropylidene)bisphenol)-carbonate), poly(poly(4,4'-isopropylidene)bisphenol)-carbonate-block-polymethyl-3,3,3-trifluoropropylsiloxane-block-poly(4,4'-isopropylidene)bisphenol)carbonate), poly(poly(4,4'-cycloheptylidenebisphenol)carbonate-block-polymethyl-3,3,3-trifluoropropylsiloxane-block-poly(4,4'-cycloheptylidenebisphenol)carbonate), poly(poly(4,4'-diphenylmethylidenebisphenol)carbonate-block-polymethyl-3,3,3-trifluoropropylsiloxane-block-poly(4,4'-diphenylmethylidenebisphenol)carbonate), poly(poly(4,4'-naphthylethylidene)bisphenol)carbonate-block-polymethyl-3,3,3, -trifluoropropylsiloxane-block-poly(4,4'-(1-naphthylethylidene)bisphenol)-carbonate), poly(poly(4,4'-(1,2-phenylenebisisopropylidene)bisphenol)carbonate-block-polymethyl-3,3,3-trifluoropropylsiloxane-block-poly(4,4'-bis-phenol)carbonate), poly(poly(4,4'-(4-t-butylcyclohexylidene)bisphenol)carbonate-block-polymethyl-3,3,3-trifluoropropylsiloxane-block-poly(4,4'-(4-t-butylcyclohexylidene)bisphenol)carbonate), poly(poly(4,4'-(1,2-diphenylethylidene)bisphenol)carbonate-block-polymethyl-3,3,3-trifluoropropylsiloxane-block-poly(4,4'-(1,2-diphenylethylidene)bisphenol)carbonate), poly(poly(4,4'-(1,3-diphenylisopropylidene)bisphenol)carbonate-block-polymethyl-3,3,3-trifluoropropylsiloxane-block-poly(4,4'-(1,3-diphenylisopropylidene)bisphenol)carbonate), and poly(poly(4,4'-(4-phenylcyclohexylidene)bisphenol)carbonate-block-polymethyl-3,3,3-trifluoropropylsiloxane-block-poly(4,4'-(4-phenylcyclohexylidene)bisphenol)carbonate).

13. An imaging member in accordance with claim 1 wherein the polycarbonate overcoating polymer is selected from the group consisting of poly(poly(4,4'-cyclohexylidenebisphenol)carbonate-block-polymethyl-3,3,3-trifluoropropylsiloxane-block-poly(4,4'-cyclohexylidenebisphenol)carbonate); poly(poly(4,4'-(1-phenylethylidene)bisphenol)carbonate-block-polymethyl-3,3,3-trifluoropropylsiloxane-block-poly(4,4'-(1-phenylethylidene)bisphenol)carbonate); poly(poly(4,4'-(1,4-phenylenebisisopropylidene)bisphenol)carbonate-block-polymethyl-3,3,3-trifluoropropylsiloxane-block-poly(4,4'-(1,4-phenylenebisisopropylidene)bisphenol)carbonate); and poly(poly(4,4'-isopropylidenebis(2-methyl)phenol)polycarbonate-block-polymethyl-3,3,3-trifluoropropylsiloxane-block-poly(4,4'-isopropylidenebis(2-methyl)phenol)carbonate); and the charge transport molecules are comprised of an arylamine.

14. An imaging member in accordance with claim 13 wherein the arylamine is N,N'-diphenyl-N,N'-bis(3-methylphenyl)1,1'-biphenyl-4,4'-diamine.

15. A photoconductive imaging member comprised of supporting substrate, a photogenerating layer, and a hole transport layer in contact with the photogenerating layer and comprised of hole transport molecules dispersed in a resinous binder, and an overcoating comprised of a polycarbonatefluorosiloxane polymer of the formula

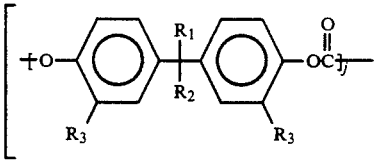

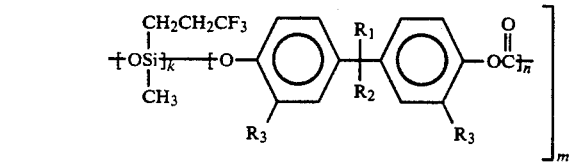

wherein $R_1$, $R_2$, and $R_3$ are independently selected from the group consisting of hydrogen, alkyl and aryl; and k, j, m and n represent the number of repeating segments.

16. A photoconductive imaging member in accordance with claim 15 wherein the photogenerating layer is comprised of inorganic or organic photoconductive pigments.

17. A photoconductive imaging member in accordance with claim 16 wherein the photogenerating layer is comprised of selenium, selenium alloys, trigonal selenium, vanadyl phthalocyanine, squaraines, perylenes, metal free phthalocyanines, metal phthalocyanines, dibromoanthanthrone pigments, or mixtures thereof.

18. A photoconductive imaging member in accordance with claim 16 wherein the resinous binder is a polyester, polyvinyl butyral, a polycarbonate, or polyvinyl formal.

19. A photoconductive imaging member in accordance with claim 16 wherein the photogenerating layer is comprised of titanyl phthalocyanine.

20. A photoconductive imaging member in accordance with claim 19 wherein titanyl phthalocyanine Type IV is selected.

21. A photoconductor consisting essentially of a photogenerating layer, in contact therewith a charge transport layer, and thereover an overcoating comprised of a polycarbonatefluorosiloxane polymer of the formula

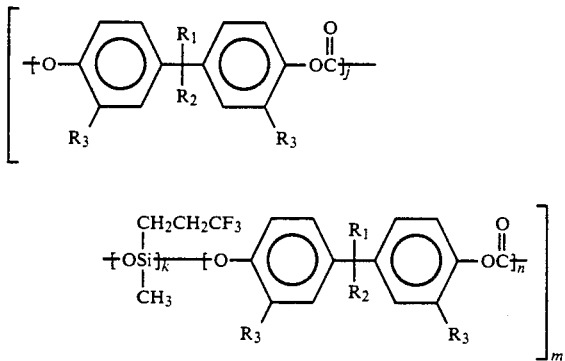

wherein R₁, R₂, and R₃ are independently selected from the group consisting of hydrogen, alkyl and aryl; and k, j, m and n represent the number of repeating segments.

22. A photoconductor comprised of a photogenerating layer, in contact therewith a charge transport layer, and thereover an overcoating comprised of a block copolymer selected from the group consisting of the block copolymers poly(poly(4,4'-(1-phenylethylidene)-bisphenol)carbonate-block-polymethyl-3,3,3-trifluoropropylsiloxane-block-poly(4,4'-(1-phenylethylidene)bisphenol)carbonate), poly(poly(4,4'-cyclohexylidenebisphenol)carbonate-block-polymethyl-3,3,3-trifluoropropylsiloxane-block-poly(4,4'-cyclohexylidenebisphenol)carbonate), poly(poly(4,4'-cyclohexylidene-2,2'-dimethylbisphenol)carbonate-block-polymethyl-3,3,3-trifluoropropylsiloxane-block-poly(4,4'-cyclohexylidene-2,2'-dimethylbisphenol)carbonate), poly(-poly(4,4'-(1,4-phenylenebisisopropylidene)bisphenol)-carbonate-block-polymethyl-3,3,3-trifluoropropylsiloxane-block-poly(4,4'-(1,4-phenylenebisisopropylidene)-bisphenol)carbonate), poly(poly(4,4'-isopropylidene)-bisphenol)carbonate-block-polymethyl-3,3,3-trifluoropropylsiloxane-block-poly(4,4'-isopropylidene)bisphenol)carbonate), poly(poly(4,4'-cycloheptylidenebisphenol)carbonate-block-polymethyl-3,3,3-trifluoropropylsiloxane-block-poly(4,4'-cycloheptylidenebisphenol)carbonate), poly(poly(4,4'-diphenylmethylidenebisphenol)carbonate-block-polymethyl-3,3,3-trifluoropropylsiloxane-block-poly(4,4'-diphenylmethylidenebisphenol)carbonate), poly(poly(4,4'-(1-naphthylethylidene)bisphenol)carbonate-block-polymethyl-3,3,3-trifluoropropylsiloxane-block-poly(4,4'-(1-naphthylethylidene)bisphenol)carbonate), poly(poly(4,4'-(1,2-phenylenebisisopropylidene)bisphenol)carbonate-block-polymethyl-3,3,3-trifluoropropylsiloxane-block-poly(4,4'-bisphenol)carbonate), poly(poly(4,4'-(4-t-butylcyclohexylidene)bisphenol)carbonate-block-polymethyl-3,3,3-trifluoropropylsiloxane-block-poly(4,4'-(4-t-butylcyclohexylidene)bisphenol)carbonate), poly(poly(4,4'-(1,2-diphenylethylidene)bisphenol)-carbonate-block-polymethyl-3,3,3-trifluoropropylsiloxane-block-poly(4,4'-(1,2-diphenylethylidene)bisphenol)carbonate), poly(poly(4,4'-(1,3-diphenylisopropylidene)bisphenol)carbonate-block-polymethyl-3,3,3-trifluoropropylsiloxane-block-poly(4,4'-(1,3-diphenylisopropylidene)bisphenol)carbonate), and poly(poly(4,4'-(4-phenylcyclohexylidene)bisphenol)-carbonate-block-polymethyl-3,3,3-trifluoropropylsiloxane-block-poly(4,4'-(4-phenylcyclohexylidene)bisphenol)carbonate).

* * * * *